United States Patent
Van Rheenen

(10) Patent No.: US 6,815,466 B2
(45) Date of Patent: Nov. 9, 2004

(54) COATING COMPOSITION CONTAINING ION EXCHANGE RESINS

(75) Inventor: Paul Ralph Van Rheenen, Warminster, PA (US)

(73) Assignee: Rohm and Haas Company, Philadelphia, PA (US)

( * ) Notice: Subject to any disclaimer, the term of this patent is extended or adjusted under 35 U.S.C. 154(b) by 170 days.

(21) Appl. No.: 10/298,718

(22) Filed: Nov. 18, 2002

(65) Prior Publication Data

US 2003/0130362 A1 Jul. 10, 2003

Related U.S. Application Data

(60) Provisional application No. 60/333,949, filed on Nov. 28, 2001.

(51) Int. Cl.⁷ .............................. C09D 5/02; C08L 57/00; B27K 3/34
(52) U.S. Cl. ........................... 521/29; 521/38; 525/186; 525/221; 525/222
(58) Field of Search ..................... 521/29, 38; 525/186, 525/221, 222

(56) References Cited

U.S. PATENT DOCUMENTS

| | | | | |
|---|---|---|---|---|
| 3,494,878 A | * | 2/1970 | Haag et al. | ............... 427/388.4 |
| 3,847,857 A | | 11/1974 | Hagg et al. | |
| 4,283,499 A | | 8/1981 | Howell | |
| 5,795,919 A | * | 8/1998 | Mitumoto et al. | ............. 521/28 |
| 5,922,777 A | * | 7/1999 | Van Rheenen | ................ 521/28 |
| 6,001,466 A | * | 12/1999 | Noguchi et al. | ............. 428/327 |

FOREIGN PATENT DOCUMENTS

| | | |
|---|---|---|
| EP | 0 799868 A | 10/1997 |
| EP | 0 802 245 A | 10/1997 |
| EP | 0 837110 A | 4/1998 |
| WO | WO 96/14357 | 5/1996 |

* cited by examiner

Primary Examiner—Kelechi C. Egwim

(57) ABSTRACT

A colloidally and sedimentation stable coating composition containing ion exchange resins is disclosed. A method of using a colloidally and sedimentation stable coating composition containing ion exchange resins is also disclosed.

9 Claims, No Drawings

COATING COMPOSITION CONTAINING ION EXCHANGE RESINS

CROSS REFERENCE TO RELATED PATENT APPLICATIONS

This is a non-provisional application of prior pending U.S. provisional application Ser. No. 60/333,949, filed Nov. 28, 2001.

The present invention relates to a colloidally and sedimentation stable coating composition containing ion exchange resins, and a method of using a colloidally and sedimentation stable coating composition containing ion exchange resins.

Coating compositions are routinely applied to the surfaces of substrates. Substrates frequently contain water soluble or extractable staining agents. When a water based coating is applied to the substrate, these staining agents often leach from the substrate into the coating, causing discoloration of the coating. For example, tannins contained in woods such as redwoods, cedar, elm, and mahogany often leach from the substrate into the coating, causing tannin staining, which appears as discoloration on the surface of the coating; salts contained in cementitious substrates often cause efflorescence, which is a staining caused by the migration of the salt to the paint coating, where it appears as white deposits; when applied to asphalt substrates, solvents contained in some coatings can cause asphalt to bleed through the coating, causing asphalt staining. Discoloration of the coating can occur even when the coating is applied to a previously coated substrate, as the leaching agent can pass through the previously applied coat, and enter the subsequently applied coat. Staining of the substrate, and of coatings previously applied to the substrate, can also be caused by sources external to the substrate. For example, cigarette smoke causes nicotine staining, which is the change in color of a light colored substrate or substrate coating; and exposure to water can cause a discoloration of the substrate or substrate coating called water spotting. These stains can leach into subsequently applied water based coatings. Each of the abovementioned types of staining is highly undesirable in coatings. Attempts have been made to resolve this problem by adding ion exchange resins to the coating formulation. However, the ion exchange resin can settle in the formulation into a hard packed sediment that is difficult to redisperse. In addition, the presence of the ion exchange resin can cause colloidal instability, which is seen as the formation of grit (a suspended gum-like material) which undesirably makes the surface of the dried coating uneven, or in extreme cases, gelation of the formulation. Therefore, there is an ongoing need for coating compositions which prevent or mitigate staining such as nicotine staining, water spotting, efflorescence, asphalt staining, or tannin staining, while remaining sedimentation stable and colloidally stable upon addition of ion exchange resins.

For example, this has been addressed by U.S. Pat. No. 3,494,878, which discloses an aqueous coating composition comprising a mixture of a water-insoluble addition polymer and an anion exchange resin (having a diameter of about 0.5 to about 25 microns). By virtue of the ion exchange resin, which is made by suspension polymerization, the coating composition is resistant to staining when applied over substrates that would tend to stain the coating composition. The addition polymer aqueous dispersion is stabilized using one or more emulsifiers. If water soluble cellulose derivatives are added to the coating composition, such addition is done during formulation of the coating composition, for bodying purposes. However, the composition of the '878 patent is neither sedimentation stable nor colloidally stable, and even when the composition is thickened with a cellulose derivative, it may become sedimentation stable, but it is not colloidally stable.

Some have been able to accomplish the creation of a coating composition that is sedimentation stable, and resistant to staining. For example, U.S. Pat. No. 3,847,857 discloses a sedimentation stable aqueous coating composition comprising a mixture of a water-insoluble addition polymer and a stably dispersed water insoluble vinyl copolymer having a size of 0.05 to 0.3 microns, which is prepared by emulsion polymerization. However, the coating composition is not colloidally stable.

Others have been able to accomplish the creation of a coating composition that is colloidally stable, and resistant to staining. For example, U.S. Pat. No. 5,922,777 discloses a grit free coating composition comprising an emulsion polymer and an ion exchange resin (having a size of 0.1 to 50 microns). Prior to addition to the emulsion polymer, the ion exchange resin is pretreated with a water-soluble anionic polymer which acts to stabilize the composition. However, the composition is not sedimentation stable, particularly with larger particle size ion exchange material. In addition, extra undesirable water soluble polymer is introduced into the coating which can detract from water resistance of the coating and the stain blocking capacity of the ion exchange material.

Applicants have discovered that by blending anion exchange particles having a size of 0.5 to 50 microns, with a water-insoluble addition copolymer, one can produce a stain resistant water based coating composition that is both sedimentation stable, and colloidally stable.

In a first aspect of the present invention there is provided an aqueous dispersion comprising a blend of: (1) an anion exchange resin having a particle size of 0.5 to 50 microns, wherein said anion exchange resin is prepared by a process selected from the group consisting of suspension polymerization, phenol formulated condensation, and condensation polymerization of at least one polyamine and epichlorohydrin; with (2) a water-insoluble addition copolymer, wherein said copolymer is prepared by emulsion polymerization; wherein said emulsion polymerization occurs in the presence of a nonionic protective colloid; wherein said copolymer has a particle size of less than one micron; wherein said aqueous dispersion has a Brookfield viscosity, at 60 rpm of less than 2000 cps; wherein said aqueous dispersion is colloidally stable and sedimentation stable.

In a second aspect of the present invention there is provided a method of preparing a coating composition comprising, blending the above-described aqueous dispersion in combination with a binder.

In a third aspect of the present invention there is provided a method of inhibiting staining of a coated substrate, comprising the steps of: (a) applying to said substrate an aqueous dispersion comprising a blend of: (1) an anion exchange resin having a particle size of 0.5 to 50 microns, wherein said anion exchange resin is prepared by a process selected from the group consisting of suspension polymerization, phenol formulated condensation, and condensation polymerization of at least one polyamine and epichlorohydrin; with (2) a water-insoluble addition copolymer, wherein said copolymer is prepared by emulsion polymerization; wherein said emulsion polymerization occurs in the presence of a nonionic protective colloid; wherein said copolymer has a particle size of less than one micron; wherein said aqueous dispersion has a Brookfield viscosity, at 60 rpm of less than 2000 cps; wherein said aqueous dispersion is colloidally stable and sedimentation stable; and (b) drying, or allowing to dry, said aqueous dispersion.

The composition of the present invention is particularly useful as a stain blocking coating composition. By "stain blocking", herein is meant preventing discoloration of the coating composition by minimizing or eliminating the tendency of stains to migrate from a substrate or a source external to the substrate, through the composition of the invention and any subsequently applied coating composition.

The composition, and methods of this invention relate to an aqueous dispersion which includes a blend of an anion exchange resin having a particle size of 0.5 to 50 microns, and which has been prepared by either suspension polymerization, phenol formulated condensation, or a condensation reaction between at least one polyamine and epichlorohydrin, with a water-insoluble addition copolymer, having a particle size of less that one micron, which has been prepared, in the presence of a nonionic protective colloid, by an emulsion polymerization process. The composition of the invention is colloidally and sedimentation stable, and has a Brookfield viscosity (as measured by Brookfield viscometer Model LVT using spindle #3 at 60 rotations per minute), of less than 2000 cps.

By "colloidally stable", herein is meant a composition having a grit level, when applied as a cast film, of at least 8 based on a rating system wherein 1 means very heavy grit, 2 means heavy/very heavy grit, 3 means heavy grit, 4 means moderate/heavy grit, 5 means moderate grit, 6 means slight/moderate grit, 7 means slight grit, 8 means trace/slight grit, 9 means trace grit, and 10 means no grit. The composition of the invention contains colloids that are resistant to agglomeration or flocculation. By "colloid", herein is meant materials existing in a finely dispersed state and having a size of $2 \times 10^{-8}$ cm to $50 \times 10^{-5}$ cm.

By "sedimentation stable", herein is meant a composition having no visible settling, in the form of a thick or hard packed layer in the bottom of the container, within 180 days. The sediment particles in the aqueous dispersion are resistant to agglomeration or flocculation. By "sediment particles", herein is meant particles of any matter which can settle or be centrifuged from the main portion of the liquid.

Without being bound by mechanism, it is believed that the sedimentation stability and colloidal stability of the composition of the invention are created by a weak interaction between the water-insoluble addition copolymer, and the anion exchange particles. It is believed that this interaction sets up a structured network that prevents settling by building a weak gel-type viscosity. This gel-type structure may be easily broken down by shearing to give desirably low viscosity at the shear rate of pumping to give easy transfer properties. The gel-type structure is prepared by making a latex dispersion that is nonionically stabilized with at least one nonionic protective colloid. The composition of the invention does not require the use of a dispersant to achieve either colloidal stability or sedimentation stability, and it is therefore preferably substantially free of dispersant.

By "protective colloid" herein is meant a material that is an effective agent for protecting charged colloidal particles in aqueous media against flocculation. Examples of suitable nonionic protective colloids include water soluble cellulose ethers such as hydroxyethylcellulose, ethyl hydroxyethylcellulose, methylcellulose, methyl hydroxypropylcellulose, and hydroxypropylcellulose; partially and fully hydrolyzed polyvinyl alcohol; polyvinyl pyrrolidone, and the like, and combinations thereof.

Another embodiment of the invention is the use of the protective colloid in combination with a surfactant. The surfactant may be a nonionic surfactant in combination with an anionic surfactant. Preferably the anionic surfactant is used in quantities below 1% by weight based on polymer solids. Where a surfactant is used in combination with the protective colloid, preferably that surfactant is a nonionic surfactant. Suitable surfactants include nonionic surfactants such as, for example, ethoxylated alkyl phenols, alcohols, fatty acids, fatty esters and oils, ethoxylated sorbitan derivatives, polysaccharide based surfactants, sucrose and glucose esters and derivatives, block polymers of ethylene oxide and propylene oxide; and anionic surfactants such as, for example, alkylaryl sulfonates, olefin sulfonates, phosphate esters, sulfates and sulfonates of fatty acids, and sulfosuccinates and derivatives thereof. The amount of protective colloid or surfactant used may be 0.2% to 8% by weight, based on the weight of total monomer.

The water-insoluble copolymer of the invention contains no surface charge (neutral) to no more than slightly negative surface charge. If the surface charge is too high, instead of a weak structure being formed that prevents settling, the composition of the invention will flocculate. A flocculated system is characterized by high levels of grit (indicating colloidal instability) and in some cases complete solidification. By "no more than slightly negative", herein is meant a level of charge which is low enough that the composition of the invention does not experience grit formation. The threshold negative surface charge level where grit begins to form will depend on the solids of the mixture, ionic strength of the water phase, pH of the system where weak acid anionic functionality is involved, and the particle sizes of the latex dispersion and anion exchange particles, in addition to the level of anionic functionality on the latex particle surface. The threshold level of anionic functionality in the latex dispersion for a particular system can be determined by varying, in a series of steps, the level of anionic functionality of polymers in the latex dispersion, from 0 to 0.2 milliequivalents per gram of dry latex polymer. The desired dispersion of anion exchange particles is added to the test latex dispersions with good mixing so that the ratio of anion exchange particles to latex dispersion is at the desired use level, pH, solids, and ionic strength. For general evaluation, a level of anion exchange particles to latex dispersion on a solids basis of 20 to 100 is useful for easily observing colloidal stability as grit formation in cast films where the anion exchange particle dispersion is around 30% solids and the latex polymer dispersion is around 50% solids.

The source of the low negative surface charge could be, for example, anionic fragments from polymerization initiators (for example sodium persulfate) or low levels of carboxyl, sulfonate, or phosphate functionality from functional monomers polymerized into the polymer composition. Another source of charge could be hydrolysis of ester groups in the polymer to produce carboxyl groups, for example, hydrolysis of ethyl acrylate in the composition to form acrylic acid functionality. Negative surface charge could also be provided by adsorbed anionic materials, such as anionic surfactants.

The water-insoluble addition copolymer of the invention has a particle size of less than one micron. At the viscosity of the composition of the invention, copolymer particles having a greater particle size tend to settle, causing sedimentation instability. The addition copolymer is prepared by emulsion polymerization to produce any of the dispersed polymer types that are now used conventionally.

These water-insoluble addition copolymers include, for example, homopolymers or copolymers of ethylenically unsaturated monomers such as (meth)acrylic acid ester monomers including methyl acrylate, ethyl acrylate, butyl acrylate, 2-ethylhexyl acrylate, decyl acrylate, methyl methacrylate, ethyl methacrylate, butyl methacrylate, hydroxyethyl methacrylate, and hydroxypropyl acrylate; acrylamide or substituted acrylamides; styrene or substituted styrenes; aliphatic dienes such as butadiene, isoprene, and chloroprene; vinyl acetate or other vinyl esters; vinyl monomers such as vinyl chloride, vinylidene chloride, vinyltoluene, N-vinyl pyrolidone; acrylonitrile or methacrylonitrile; and ethylenically unsaturated monomers such as ethylene, isobutylene, and nitriles or amides of (meth)acrylic acid, and combinations thereof. Preferably the water-insoluble addition copolymer is a vinyl ester polymer, a (meth)acrylic ester copolymer, or a vinyl hydrocarbon copolymer. Preferably, the monomer mixture used to make the water-insoluble addition copolymer includes at least one acid monomer in quantities such that the copolymer has an anionic acid functionality of no more than 0.07 milliequivalents of carboxylic acid functional groups per gram of dry copolymer, and no more than 0.018 milliequivalents of strong acid functional groups per gram of dry copolymer. By "strong acid", herein is meant acids having sulfate, sulfonate or phosphate functionality, such as, for example sodium vinyl sulfate.

Thermal or redox initiation processes may be used to form the water-insoluble addition copolymer. Conventional free radical initiators may be used such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.2% to 3% by weight, based on the weight of total monomer. Redox systems using the same initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadine-sulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used.

Chain transfer agents such as, for example, halogen compounds such as tetrabromomethane; allyl compounds; or mercaptans such as alkyl thioglycolates, alkyl mercaptoalkanoates, and $C_4$–$C_{22}$ linear or branched alkyl mercaptans may be used to lower the molecular weight of the water-insoluble addition polymer and/or to provide a different molecular weight distribution than would otherwise have been obtained with any free-radical-generating initiator(s). Chain transfer agent(s) may be added in one or more additions or continuously, linearly or not, over most or all of the entire reaction period or during limited portion(s) of the reaction period such as, for example, in the kettle charge and in the reduction of residual monomer stage. Preferred is the use of 0.05 wt % to 2 wt % chain transfer agent, based on the total weight of monomer used to form the aqueous emulsion copolymer; more preferred is the use of 0.1 wt % to 1 wt % chain transfer agent, based on the total weight of monomer used to form the aqueous emulsion copolymer.

In another aspect of the present invention the water-insoluble addition copolymer is prepared by a multistage process in which at least two stages differing in composition are polymerized in sequential fashion. Such a process usually results in the formation of at least two mutually incompatible polymer compositions, thereby resulting in the formation of at least two phases within the polymer particles of the mode. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged polymer may contain the same monomers, surfactants, chain transfer agents, etc. as disclosed herein for the insoluble addition polymer. The polymerization techniques used to prepare such multistage emulsion polymers are well known in the art such as, for example, U.S. Pat. Nos. 4,325,856; 4,654,397; and 4,814,373. It is also contemplated that the water-insoluble addition copolymer may contain one or more polymer modes.

The composition of the invention may contain a crosslinking agent, such as, for example, a polyaziridine, polyisocyanate, polycarbodiimide, polyepoxide, polyaminoplast, polyalkoxy silane, polyoxazolidine, polyamine and a polyvalent metal compound; providing that the crosslinking agent does not inhibit film formation. Typically, from 0.05 weight percent to 15 weight percent of the crosslinking agent is used, based on the weight of the polymer solids.

Anion exchange resins are used in the present invention to improve the stain blocking performance of the coating compositions in which they are used. Anion exchange resins, that is, ion exchange resin particles having a positively charged surface and positively charged sites throughout the particles that hold and exchange negatively charged ions, may be, for example copolymers of styrene or divinylbenzene which are chloromethylated and then reacted to form quarternary ammonium groups therein by means of tertiary amines or to form simple amine groups by means of primary or secondary amines. The ion exchange resins may be gel type or macroreticular type resins. The anion exchange resins of the invention are prepared by either suspension polymerization, phenol formulated condensation, or a condensation reaction between at least one polyamine and epichlorohydrin. Suspension processes that may be used to make the anion exchange resin are well known in the art, see for example U.S. Pat. No. 4,283,499. Typically, suspension polymerization produces crosslinked polystyrene ion exchange resins having a particle size of approximately 100 microns to 500 microns. The anion exchange resins made by the suspension polymerization process may be ground by any milling equipment suitable for producing particles in the size range of the invention, which is, preferably 0.5 to 50 microns, more preferably 0.5 microns to 35 microns, and most preferably from 0.5 microns to 25 microns. The particle size may be measured on a Coulter™ LS, light scattering, particle size analyzer. Suitable mills are attrition mills, fluid-energy mills, colloid mills, vibratory ball mills (vibro-energy mills), pin mills, ball mills, roller mills, and autogenous and semiautogenous mills. Likewise a combination of mills could be used to possibly increase speed where the first mill reduces particle size to, for example, less than 100 microns and a second mill reduces the particle size further to the desired range. An example would be the initial use of a hammer mill followed by a semiautogenous mill like a Dyno-Mill™ from CB Mills Inc (Buffalo Grove, Ill.). Where grinding is necessary, the anion exchange resin can be ground in the presence of the latex or first ground and then blended with the latex.

Alternatively, the anion exchange resin may be made by phenol formulated condensation, or by a condensation reaction between at least one polyamine and epichlorohydrin. By "phenol-formulated condensation" herein is meant a reaction between phenol, formaldehyde, and at least one polyamine, such as for example, triethylene tetramine, which produces a phenol-formulated resin. The condensation reaction between the at least one polyamine and epichlorohydrin produces a polyalkylamine resin. Both of the above-mentioned types of reaction are well known in the art, see for example, Encyclopedia of Polymer Science and Engineering, Ed. Herman F. Mark, Vol 8, pp 341–393, John Wiley and Sons NY, (1987).

The amount of anion exchange resin used in this invention is from 2.5% to 40% based on the volume solids of the paint or coating. More preferred is from 3.5% to 30% anion exchange resin based on the volume solids of the paint. Most preferred is from 5% to 25% anion exchange resin based on the volume solids of the paint. Preferably, the aqueous composition of the invention contains 30% to 65%, more preferably 40% to 65%, solids dispersion in water. Preferably, the ratio of the anion exchange resin to water-insoluble addition copolymer is 2:100 to 1:1, more preferably 5:100 to 1:1.

The composition of the invention can be used directly as a stain blocking coating or primer, or formulated with conventional coating materials: coalescents, glycols, fillers, pigments, wetting agents, defoamers, biocides, thickeners, etc. as desired. Another embodiment of the invention is a method of using the composition of the invention in combination with a binder. Surprisingly, when the composition is used in this manner as an anion exchange resin concentrate, the combined composition and binder maintain colloidal and sedimentation stability. Suitable binders include polymers such as for example, polyurethane, a polyester, an acrylic copolymer, a styrene/acrylic copolymer, an epoxy polymer, or other polymers.

Another embodiment of the invention is a method for inhibiting staining of a coated substrate by applying the composition of the invention to the substrate. The composition of the invention may applied by conventional application methods such as, for example, brushing and spraying methods such as, for example, roll coating, doctor-blade application, printing methods, air-atomized spray, air-assisted spray, airless spray, high volume low pressure spray, and air-assisted airless spray. Typical substrates to which the composition of the invention may be applied include, plastic, wood, metal, plastic, wall board, primed surfaces, previously painted surfaces, and cementitious substrates.

The substrate may have disposed upon it markings deposited by aqueous or non-aqueous compositions such as those from marking pens, or which contain stain bodies such as tannins where such stains are capable of appearing, to a greater or lesser extent, on the surface of a dry later-deposited coating. Without being bound by mechanism, it is believed that stains from the substrate, or from sources external to the substrate (for example cigarette smoke) become solubilized or dispersed in wet coating compositions applied to the substrate, and migrate sufficiently so as to appear on the surface of the dry coating, or of dry later-applied coatings, thus defeating one of the objectives of applying the coating, namely, to hide unsightly stains. It is believed that, when dry, the composition of the invention blocks and/or locks in the stains so that they cannot appear on the visible surface of dry coatings. The composition of the invention is typically dried, or allowed to dry, at a temperature from 10° C. to 95° C.

The following examples are presented to illustrate the properties of the invention.

EXAMPLE C1 —Anion Exchange Resin Dispersion

To 120 grams on a solids basis of a quaternary ammonium functional styrene/divinyl benzene resin made by the methods of U.S. Pat. No. 2,591,573 (Amberjet™ 4400 in chloride counter ion form) was added water to bring the solids to 30%. This mixture was ground on a vibro energy mill for 6 hours using ½ inch zirconia media to obtain a mean particle of 10 microns as measured by Coulter LS particle size analyzer. On standing overnight the material settled giving a hard packed sediment.

EXAMPLE C2

Rovace™ 661 (55% solids latex of vinyl acetate and butyl acrylate stabilized with nonionic surfactant and hydroxyethyl cellulose, particle size is 0.3 micron). The polymer has a low level of anionic charge due to the equivalence of 0.5% acrylic acid in the composition, based on solids. Hydrolyzed carboxylic acid level was determined by conductometric titration of Rovace™ 661 after deionization with a mixed bed ion exchange resin, Amberlite™ IRN 150.

EXAMPLE C3

Rhoplex™ AC-1034. A styrene acrylic emulsion polymer containing about 3% acid (calculated as methacrylic) polymerized with nonionic and anionic surfactant to give a 47% solids dispersion.

EXAMPLES 4A–4E, C4F–C4L, 4M

In Examples 4A–4E, the Example C1 anion exchange dispersion was blended with the Example C2 Rovace™ 661 emulsion polymer. In Examples C4F–C4L, and Example 4M, the Example C1 anion exchange dispersion was blended with various emulsion polymers.

EXAMPLES C5A, 5B–5F

The blends 4B through 4E were used as an ion exchange resin concentrate, adding 2.5% to 5% ion exchange resin to a latex polymer (Example C3, Rhoplex™ AC1034) which served as the primary binder in the coating. The control is Example C5A, where the 30% dispersion of ion exchange resin (Example C1) was directly mixed with Rhoplex™ AC1034. Mixing was done using an overhead stirrer with good agitation.

TABLE 1

Composition of Examples

| Example Number | Water Insoluble Addition Copolymer Type | (g) | Stabilizer NPC | Stabilizer NS | Stabilizer AS | Acid Monomer (milliequivalents/g) | % Solids | Parts IER Solids to 100 Parts Polymer Solids | Grams of Example C1 (IER Dispersion) | Concentrate Example Number | Grams | % IER |
|---|---|---|---|---|---|---|---|---|---|---|---|---|
| C1 | n/a | | | | | | | | | | | 100 |
| C2 | Rovace™ 661 | | ✓ | ✓ | | $^w$0.07 | 55 | | | | | |
| C3 | Rhoplex™ AC 1034 | | ✓ | ✓ | ✓ | $^w$0.34 | 47 | | | | | |
| Blends of Example C1 With Example C2 Polymer | | | | | | | | | | | | |
| 4A | Rovace™ 661 | 100 | ✓ | ✓ | | $^w$0.07 | 55 | 5 | 9.14 | | | |
| 4B | Rovace™ 661 | 100 | ✓ | ✓ | | $^w$0.07 | 55 | 20 | 36.67 | | | |
| 4C | Rovace™ 661 | 100 | ✓ | ✓ | | $^w$0.07 | 55 | 35 | 64.17 | | | |
| 4D | Rovace™ 661 | 100 | ✓ | ✓ | | $^w$0.07 | 55 | 50 | 91.67 | | | |
| 4E | Rovace™ 661 | 100 | ✓ | ✓ | | $^w$0.07 | 55 | 100 | 183.33 | | | |
| Blends of Emulsion Polymers With Example C1 | | | | | | | | | | | | |
| C4F | Rhoplex™ AC-2235 | 100 | | ✓ | | $^w$0.118 | 46.5 | 20 | 31 | | | |
| C4G | Rhoplex™ AC-2235 mixed with Rhoplex™ PR-26 | 100 31 | | ✓ ✓ | | $^w$0.118 none | 46.5 30 | 20 | | | | |
| C4H | Rhoplex™ SG10M | 100 | | | ✓ | $^w$0.118 | 50 | 20 | 33.3 | | | |
| C4I | Rhoplex™ AC1034 | 100 | | ✓ | ✓ | $^w$0.34 | 47 | 20 | 31.6 | | | |
| C4J | Rovace™ 9100 | 100 | ✓ | ✓ | ✓ | $^s$0.019 | 55 | 20 | 36.7 | | | |
| C4K | Rhoplex™ AC417M | 100 | ✓ | | ✓ | $^w$0.156 | 48 | 20 | 32 | | | |
| C4L | Polyco™ 3368 | 100 | | ✓ | ✓ | $^s$0.168 | 51 | 20 | 34 | | | |
| 4M | Airflex™ 465 | 100 | ✓ | | | none | 65 | 20 | 43.33 | | | |
| Emulsion Polymer/IER Blends Used As IER Concentrates | | | | | | | | | | | | |
| C5A | Rhoplex™ AC1034 | 100 | | ✓ | ✓ | $^{AA}$0.034 | 47 | | | 1 | 7.8 | 5 |
| 5B | Rhoplex™ AC1034 | 100 | | ✓ | ✓ | $^{AA}$0.034 | 47 | | | 4B | 29.22 | 5 |
| 5C | Rhoplex™ AC1034 | 100 | | ✓ | ✓ | $^{AA}$0.034 | 47 | | | 4C | 20.04 | 5 |
| 5D | Rhoplex™ AC1034 | 100 | | ✓ | ✓ | $^{AA}$0.034 | 47 | | | 4D | 16.38 | 5 |
| 5E | Rhoplex™ AC1034 | 100 | | ✓ | ✓ | $^{AA}$0.034 | 47 | | | 4E | 12.10 | 5 |
| 5F | Rhoplex™ AC1034 | 100 | | ✓ | ✓ | $^{AA}$0.034 | 47 | | | 4B | 14.61 | 2.5 |

NOTE:
Example numbers prefaced by "C" are comparative examples
$^{AA}$ = acrylic acid
AS = anionic surfactant
MAA = methacrylic acid
MAH = maleic anhydride
NPC = nonionic protective colloid
NS = nonionic surfactant
SVS = sodium vinyl sulfonate
$^w$ = milliequivalents/g of acid monomer calculated as acrylic
$^s$ = milliequivalents/g of strong acid monomer calculated as sulfonate function monomer
Rovace™ 661 (latex of vinyl acetate and butyl acrylate containing an equivalence of 0.5% acrylic acid) is made by Rohm and Haas Company located in Philadelphia, Pennsylvania.
Rhoplex™ AC-2235 (acrylate emulsion polymer containing about 1% methacrylic acid) is made by Rohm and Haas Company located in Philadelphia, Pennsylvania.
Rhoplex™ PR-26 (quaternary ammonium functional cationic emulsion polymer, total solids = 30%, particle size = 0.1 micron) is made by Rohm and Haas Company located in Philadelphia, Pennsylvania.
Rhoplex™ SG10M (acrylate emulsion polymer containing about 1% methacrylic acid) is made by Rohm and Haas Company located in Philadelphia, Pennsylvania.
Rhoplex™ AC1034 (styrene acrylic emulsion polymer containing about 3% methacrylic acid) is made by Rohm and Haas Company located in Philadelphia, Pennsylvania.
Rovace™ 9100 (anionic vinyl acetate acrylate emulsion polymer) is made by Rohm and Haas Company located in Philadelphia, Pennsylvania.
Rhoplex™ AC417M (lightly carboxylated acrylate emulsion polymer) is made by Rohm and Haas Company located in Philadelphia, Pennsylvania.
Polyco™ 3368 (lightly carboxylated vinyl acetate acrylate emulsion polymer) is made by Rohm and Haas Company located in Philadelphia, Pennsylvania.
Airflex™ 465 (ethylene/vinyl acetate emulsion polymer) is made by Air Products located in Allentown, Pennsylvania.

TABLE 2

Example C6: Semi-Gloss Paint

| Material | Grams |
| --- | --- |
| Propylene glycol | 70 |
| Tamol ™ 731 (25%) | 14.9 |
| Nopco ™ NXZ defoamer | 1 |
| Water | 20 |
| Ti-Pure ™ R-900 | 275 |
| The above materials were mixed on a high speed Cowles Mill to give a good dispersion | |
| The following are mixed with good stirring | |
| Water | 50 |
| Rhoplex ™ AC-507 polymer dispersion (46.5%) | 546.7 |
| Nopco ™ NXZ | 1 |
| Ammonium Hydroxide (28%) | 2 |
| Propylene glycol | 30 |
| *Acrysol ™ G-110 (22%) | 10 |
| *Water | 24.5 |

NOTE:
*Premixed before addition
Tamol ™ 731 (25%) is made by Robm and Haas Company, located in Philadelphia, Pennsylvania.
Rhoplex ™ AC-507 polymer dispersion (46.5%) is made by Rohm and Haas Company, located in Philadelphia, Pennsylvania.
Acrysol ™ G-110 (22%) is made by Rohm and Haas Company, located in Philadelphia, Pennsylvania.
Nopco ™ NXZ defoamer is made by Henkel, located in Dusseldorf, Germany.
Ti-Pure ™ R-900 is made by Du Pont, located in Wilmington, Delaware.

Test Method for Sedimentation Stability and Viscosity Measurement

Materials were mixed with good stirring using an overhead stirrer. Spindle 3 was used, and viscosity was measured at 6 and 60 rpms using a Brookfield viscometer (LVT). Sedimentation stability was measured by using a spatula to check for sediment on the bottom of samples stored in 2 oz jars after 7 days and 180 days. Sediment can easily be seen in this way as a thick or hard packed layer in the bottom of the container. Data are shown in Table 3. Note that even though the overall solids of the blend decreased as the level of ion exchange resin increased, because we were blending a 30% solids ion exchange dispersion with a 55% solids latex, viscosity increased up to 50% ion exchange resin and then decreased back to about the same as the 0% control at high dilution with the 100% level (Example 4E).

The '6/60 ratio' is the ratio of viscosity at 6 rpm divided by viscosity at 60 rpm. This ratio is a measure of the shear thinning behavior, or the relative structure of the blend. The higher the 6/60 ratio, the more structure the example contains. The 6/60 ratio in each blend case was higher than the base emulsion, Example C2, further indicating an interaction between the two types of particles that prevents settling.

Test Method for Colloidal Stability

Gloss Testing as an Indication of Colloidal Stability.

The test coat was applied to Lenta 5C charts with a 2 mil bird applicator and allowed to dry for 3 days. Gloss was measured at 60 degrees using a Gardner gloss meter.

Grit Testing as an Indication of Colloidal Stability.

The test coat was applied to Lenta 5C charts with a 2 mil bird applicator and allowed to dry for 3 days.

The rating system for grit level was as follows:

```
10 = none
 9 = trace
 8 = trace/slight
 7 = slight
 6 = slight/moderate
 5 = moderate
 4 = moderate/heavy
 3 = heavy
 2 = heavy/very heavy
 1 = very heavy
```

A rating of greater than 8 is considered practically acceptable for visual appearance.

In addition to higher grit rating, the higher gloss of Examples 5B–5E compared to 5A demonstrates the improved colloidal stability that is obtained by using the stabilized concentrate approach. All samples containing the ion exchange resin show very good stain blocking properties.

Test Method for Cedar Stain Blocking

The test (primer) coating was painted on severe, dark cedar siding panels at a coverage rate of 400 $ft^2$/gal and allowed to dry for 2 hours. The test coating was then top coated with Semigloss paint (Example C6) at the same coverage rate and placed in a 100% relative humidity box for 18 hr. The painted panels were then taken out of the humidity box to allow the top coat to dry at ambient conditions. The stain blocking ability of the test coating was rated after an additional 24 hours on a scale of 1 to 10 where 10 represents no signs of staining. The rating system for stain level was as follows:

```
10 = none
 9 = trace
 8 = trace/slight
 7 = slight
 6 = slight/moderate
 5 = moderate
 4 = moderate/heavy
 3 = heavy
 2 = heavy/very heavy
 1 = very heavy
```

A rating of greater than 8 is considered practically acceptable for visual appearance.

TABLE 3

Stain Blocking, Sedimentation Stability, and Colloidal Stability Testing Results

| Example Number | Stain Blocking Rating | Colloidal Stability 60 Degree Gloss For Samples Containing 5 Parts IER | Grit Rating | Sedimentation Stability Settling 7 Day | 180 Days | Viscosity 6 Cps | 60 Cps | 6/60 Ratio | Total Solids of Blend Dispersion |
|---|---|---|---|---|---|---|---|---|---|
| C1 | | | | Hard pack | Hard pack | n/a | n/a | n/a | 30% |
| C2 | 5 | n/a | n/a | n/a | n/a | 1600 | 460 | 3.47 | 55% |
| C3 | 5 | n/a | n/a | | | | | | |
| 4A | 8 | n/a | 10 | none | none | 1800 | 510 | 3.53 | 52.9% |
| 4B | | | 10 | none | none | 2800 | 740 | 3.78 | 48.3% |
| 4C | | | | none | none | 4280 | 860 | 4.98 | 45.2% |
| 4D | | | | none | none | 2360 | 520 | 4.54 | 43.03% |
| 4E | | | | none | none | 1720 | 412 | 4.17 | 38.8% |
| C4F | | | 5 | 2 layers, bottom hard packed | | | | | |
| C4G | | Gelled upon mixing, therefore could not be tested for stain blocking or colloidal stability | | | | | | | |
| C4H | | | 4 | 2 layers, bottom hard packed | | | | | |
| C4I | | | 2 | 2 layers, bottom hard packed | | | | | |
| C4J | | | 7 | none | | | | | |
| C4K | | | 7 | none | | | | | |
| C4L | | | 1 (gelled) | Unstable, flocculated into a gel | | | | | |
| 4M | | | 9 | none | | | | | |
| C5A | 9 | 29.4 | 6 | | | | | | |
| 5B | 9 | 44.0 | 10 | | | | | | |
| 5C | not measured | 41.4 | 10 | | | | | | |
| 5D | 9 | 32.9 | 9 | | | | | | |
| 5E | 9 | 33.2 | 8 | | | | | | |
| 5F | 9 | n/a | 10 | | | | | | |
| C6 | 0 | n/a | n/a | | | | | | |

NOTE:
Example numbers prefaced by "C" are comparative examples

What is claimed:

1. An aqueous dispersion comprising a blend of:
   (1) an anion exchange resin having a particle size of 0.5 to 50 microns,
      wherein said anion exchange resin is prepared by a process selected from the group consisting of suspension polymerization, phenol formulated condensation and condensation polymerization of at least one polyamine and epichlorohydrin; with
   (2) a water-insoluble addition copolymer,
      wherein said copolymer is prepared by emulsion polymerization;
      wherein said emulsion polymerization occurs in the presence of a nonionic protective colloid;
      wherein said copolymer has a particle size of less than one micron;
      wherein said aqueous dispersion has a Brookfield viscosity, at 60 rpm using spindle 3, of less than 2000 cps;
      wherein said aqueous dispersion is colloidally stable and sedimentation stable.

2. The aqueous dispersion, as recited in claim 1, wherein said water-insoluble addition copolymer is selected from the group consisting of vinyl ester polymers, acrylic ester copolymers, and vinylhydrocarbon copolymers.

3. The aqueous dispersion, as recited in claim 1, wherein said water-insoluble addition copolymer has an anionic acid functionality of no more than 0.07 milliequivalents of carboxylic acid functional groups per gram of dry copolymer, wherein said water-insoluble addition copolymer has an anionic acid functionality of no more than 0.018 milliequivalents of strong acid functional groups per gram of dry copolymer.

4. The aqueous dispersion, as recited in claim 1, wherein said dispersion is substantially free of a dispersant.

5. The aqueous dispersion, as recited in claim 1, wherein said emulsion polymerization occurs in the presence of said nonionic protective colloid and a surfactant;
   wherein said surfactant is a surfactant selected from the group consisting of nonionic surfactant, and mixtures of nonionic surfactant with anionic surfactant;
   wherein said anionic surfactant is present in quantities below 1% by weight, based on polymer solids.

6. The aqueous dispersion, as recited in claim 1, wherein the ratio of said anion exchange resin to said water-insoluble addition copolymer on a dry weight basis is 2:100 to 1:1.

7. The aqueous dispersion, as recited in claim 1, wherein said aqueous dispersion is 30 to 65% solids dispersion in water.

8. A method of preparing a coating composition comprising, blending the aqueous dispersion of claim 1, in combination with a binder.

9. A method of inhibiting staining of a coated substrate, comprising the steps of:
   (a) applying to said substrate an aqueous dispersion comprising a blend of:
      (1) an anion exchange resin having a particle size of 0.5 to 50 microns, wherein said anion exchange resin is prepared by a process selected from the group consisting of suspension polymerization, phenol formulated condensation and condensation polymerization of at least one polyamine and epichlorohydrin; with (2) a water-insoluble addition copolymer,
wherein said copolymer is prepared by emulsion polymerization;
wherein said emulsion polymerization occurs in the presence of a nonionic protective colloid;
wherein said copolymer has a particle size of less than one micron;
wherein said aqueous dispersion has a Brookfield viscosity, at 60 rpm using spindle 3, of less than 2000 cps;
wherein said aqueous dispersion is colloidally stable and sedimentation stable; and (b) drying, or allowing to dry, said aqueous dispersion.

* * * * *

UNITED STATES PATENT AND TRADEMARK OFFICE
CERTIFICATE OF CORRECTION

PATENT NO. : 6,815,466 B2
DATED : November 9, 2004
INVENTOR(S) : Paul Ralph Van Rheenen It is certified that error appears in the above-identified patent and that said Letters Patent is hereby corrected as shown below:

Column 2,
Lines 40 and 62, delete "formulated" and insert -- formaldehyde --.

Column 3,
Line 18, delete "formulated" and insert -- formaldehyde --.

Column 6,
Line 50, delete "formulated" and insert -- formaldehyde --.

Column 7
Lines 6, 11 and 16, delete "formulated" and insert -- formaldehyde --.

Column 13,
Line 45, delete "formulated" and insert -- formaldehyde --.

Column 15,
Line 3, delete "formulated" and insert -- formaldehyde --.

Signed and Sealed this

Fifteenth Day of February, 2005

JON W. DUDAS
*Director of the United States Patent and Trademark Office*